United States Patent
Ishigaki et al.

(10) Patent No.: US 12,122,193 B2
(45) Date of Patent: Oct. 22, 2024

(54) PNEUMATIC TIRE AND METHOD FOR MANUFACTURING THE SAME

(71) Applicant: Sumitomo Rubber Industries, Ltd., Kobe (JP)

(72) Inventors: Yuichi Ishigaki, Kobe (JP); Masahiro Yao, Kobe (JP); Mami Monji, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/830,484

(22) Filed: Jun. 2, 2022

(65) Prior Publication Data

US 2022/0410639 A1   Dec. 29, 2022

(30) Foreign Application Priority Data

Jun. 28, 2021 (JP) ................................. 2021-106890

(51) Int. Cl.
*B60C 15/06*  (2006.01)
*B29D 30/48*  (2006.01)

(52) U.S. Cl.
CPC .... *B60C 15/0607* (2013.01); *B29D 2030/482* (2013.01); *B29D 2030/486* (2013.01);
(Continued)

(58) Field of Classification Search
CPC ................ B60C 15/06; B60C 15/0607; B60C 2015/061; B60C 2015/0614;
(Continued)

(56) References Cited

U.S. PATENT DOCUMENTS 4,953,605 A * 9/1990 Kawamura ......... B60C 15/0607
152/554
5,131,447 A * 7/1992 Nakagawa .............. B60C 15/06
152/546
(Continued)

FOREIGN PATENT DOCUMENTS

EP   0 997 325 A1   5/2000
JP   10076819 A *   3/1998  ............. B60C 15/06
(Continued)

OTHER PUBLICATIONS

Shin Cheol Lee, KR1998025422A, machine translation. (Year: 1998).*
(Continued)

*Primary Examiner* — Sedef E Paquette
(74) *Attorney, Agent, or Firm* — Birch, Stewart, Kolasch & Birch, LLP

(57) ABSTRACT

A pneumatic tire includes a pair of bead portions, a pair of bead cores each disposed in a respective one of the pair of bead portions, a carcass extending between the pair of bead cores, the carcass including a carcass ply that includes a main portion extending between the pair of bead cores and a pair of turn-up portions each turned up around a respective one of the pair of bead cores from axially inside to outside of the tire and extending outwardly in a tire radial direction, and a reinforcing rubber layer disposed in each bead portion and being adjacent to an axially outside of the turn-up portion, wherein the reinforcing rubber layer has a laminated body in which a plurality of sheet-shaped rubber members having different radial lengths are laminated in the tire axial direction.

19 Claims, 5 Drawing Sheets

(52) U.S. Cl.
CPC ............... *B60C 2015/061* (2013.01); *B60C 2015/0614* (2013.01); *B60C 2015/0621* (2013.01)

(58) Field of Classification Search
CPC .... B60C 2015/0617; B60C 2015/0621; B60C 2015/0628; B60C 2015/0635; B60C 2015/065; B29D 2030/482; B29D 2030/486
USPC .............................. 156/130.7; 152/539, 542
See application file for complete search history.

(56) References Cited

U.S. PATENT DOCUMENTS

| | | | | |
|---|---|---|---|---|
| 5,415,216 | A | * | 5/1995 | Kajiwara ............... B60C 15/06 152/533 |
| 5,725,702 | A | * | 3/1998 | Nakamura .......... B60C 15/0607 152/543 |
| 5,733,395 | A | * | 3/1998 | Nakagawa ............ B60C 15/06 152/546 |
| 2012/0067493 | A1 | * | 3/2012 | Venkataramani ... B60C 15/0607 152/540 |
| 2015/0298509 | A1 | * | 10/2015 | Shimamura ......... B60C 15/0009 152/541 |
| 2016/0114633 | A1 | | 4/2016 | Miyasaka |
| 2016/0200150 | A1 | | 7/2016 | Yamamoto et al. |
| 2017/0129291 | A1 | | 5/2017 | Miyasaka |
| 2019/0184765 | A1 | * | 6/2019 | Krier ................... B60C 15/0635 |
| 2020/0001665 | A1 | * | 1/2020 | Hamada ................. B60C 15/06 |

FOREIGN PATENT DOCUMENTS

| | | |
|---|---|---|
| JP | 6393194 B2 | 9/2018 |
| KR | 1998025422 A * | 7/1998 |

OTHER PUBLICATIONS

Kobayashi Y, JP-10076819-A, machine translation. (Year: 1998).*
Extended European Search Report dated Nov. 9, 2022 for Application No. 22174145.7.

* cited by examiner

PNEUMATIC TIRE AND METHOD FOR MANUFACTURING THE SAME

RELATED APPLICATIONS

This application claims the benefit of foreign priority to Japanese Patent Application No. JP2021-106890, filed Jun. 28, 2021, which is incorporated by reference in its entirety.

FIELD OF THE INVENTION

The present disclosure relates to a pneumatic tire and a method for manufacturing the same.

BACKGROUND OF THE INVENTION

Patent Document 1 below describes a pneumatic tire that includes a carcass including a first ply having a pair of turn-up portions, a pair of fillers, and a pair of apex components in the beads. Each filler is located axially outward of a corresponding one of the turn-up portions of the first ply. Each filler may suppress the deformation of the apex components and improve the durability of the pneumatic tire.

CITATION LIST

Patent Document

[Patent document 1] Japanese Patent 6393194

SUMMARY OF THE INVENTION

Fillers as mentioned above are generally extruded using a rubber extruder. Rubber extruders, for example, are provided with a die plate for discharging a filler strip in a predetermined profile. In order to manufacture multiple types of fillers according to the tire size, it is necessary to prepare a plural kinds of die plates in different sizes and to replace them according to the tire size.

The present disclosure has been made in view of the above circumstances, and has a main object to provide a pneumatic tire that can help simplify the manufacturing process.

In one aspect of the present disclosure, a pneumatic tire includes a pair of bead portions, a pair of bead cores each disposed in a respective one of the pair of bead portions, a carcass extending between the pair of bead cores, the carcass including a carcass ply that comprises a main portion extending between the pair of bead cores and a pair of turn-up portions each turned up around a respective one of the pair of bead cores from axially inside to outside of the tire and extending outwardly in a tire radial direction, and a reinforcing rubber layer disposed in each bead portion and being adjacent to an axially outside of the turn-up portion. The reinforcing rubber layer has a laminated body in which a plurality of sheet-shaped rubber members having different radial lengths are laminated in the tire axial direction.

DETAILED DESCRIPTRION OF THE INVENTION

Figure 1:
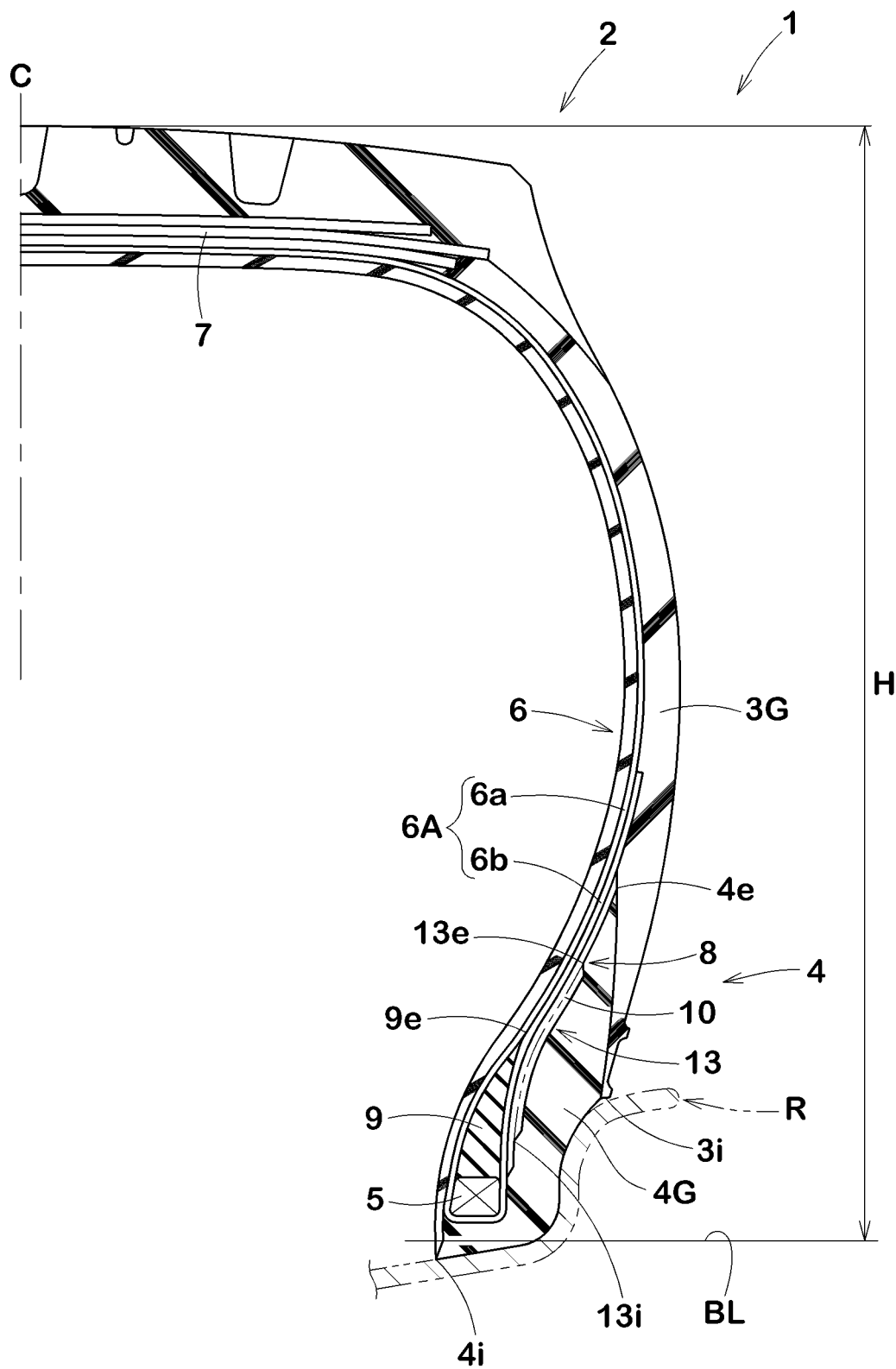
FIG. 1 is a tire meridian cross sectional view of a tire according to the present embodiment.

Hereinafter, one or more embodiments of the present disclosure will be described based on the drawings. Note that throughout the embodiments the same elements are denoted by the same reference numerals, and detailed description thereof will be omitted. FIG. 1 is a tire meridian cross sectional view including a tire rotation axis (not illustrated) of the right half of a pneumatic tire (hereinafter it may be referred to simply as "tire") 1 according to the present embodiment. The present disclosure, for example, is embodied for tires of commercial vehicle and light trucks. However, the present disclosure is not limited to such tires. In FIG. 1, the tire 1 is in a normal state.

As used herein, the "normal state" is such that the tire 1 is mounted onto a normal rim R with a normal inner pressure but loaded with no tire load. Unless otherwise noted, dimensions of portions of the tire 1 are values measured under the normal state.

As used herein, the "normal rim R" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "normal inner pressure" is an inner air pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As illustrated in FIG. 1, the tire 1 according to the present embodiment includes a tread portion 2, a pair of bead portions 4, a pair of bead cores 5 each disposed in a respective one of the bead portions 4, and a carcass 6 extending between the pair of bead cores 5.

The carcass 6 includes a carcass ply 6A that includes a main portion 6a extending between the bead cores 5 and a pair of turn-up portions 6b each turned up around a respective one of the bead cores 5 from axially inside to the outside of the tire and then extending outwardly in the tire radial direction. The carcass 6, in the present embodiment, is composed of a single carcass ply 6A. Alternately, the carcass 6, for example, may be composed of a plurality of carcass plies (not illustrated).

In each bead portion 4, a reinforcing rubber layer 8 is disposed adjacent to an axially outside of the turn-up portion 6b, and preferably the reinforcing rubber layer 8 is in direct contact with the turn-up portion 6b, for example. Such a reinforcing rubber layer 8 can enhance the rigidity of each bead portion 4 to improve durability of the tire.

Figure 2:
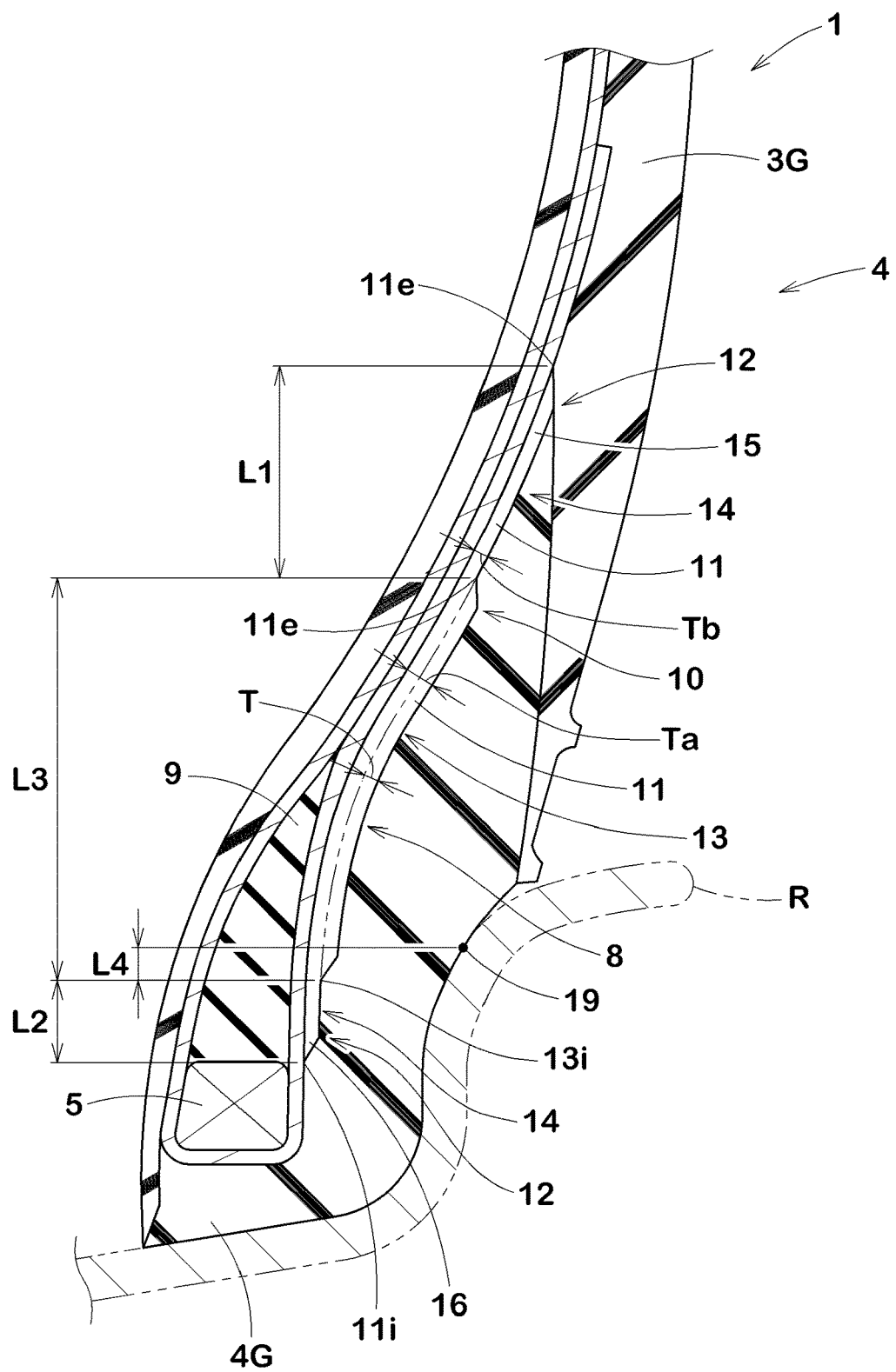
FIG. 2 is an enlarged view of a bead portion of FIG. 1.

FIG. 2 is an enlarged view of the bead portion 4 of FIG. 1. As illustrated in FIG. 2, the reinforcing rubber layer 8 has a laminated body 10 in which a plurality of sheet-shaped rubber members 11 having different radial lengths are laminated in the tire axial direction. Such a laminated body 10 can simplify the manufacturing process of the tire. The reason for the simplification will be described later.

As illustrated in FIG. 1, the tread portion 2 according to the present embodiment includes a conventional belt layer 7 disposed radially outwardly of the carcass 6. The tread portion 2 is not limited to such an embodiment, and various well-known structures may be adopted.

Each bead portion 4 according to the present embodiment includes a bead apex rubber 9 extending outwardly in the tire radial direction from the bead core 5. In each bead portion 4, a sidewall rubber 3G is provided on axially outwardly of the reinforcing rubber layer 8. Furthermore, a clinch rubber 4G is also provided in each bead portion 4. The clinch rubber 4G is connected to the sidewall rubber 3G and covers the reinforcing rubber layer 8 from axially outside of the tire. The sidewall rubber 3G and the clinch rubber 4G form a part of an outer surface of the tire 1.

In a tire meridian cross sectional view as shown in FIG. 2, a thickness of the reinforcing rubber layer 8 decreases from a center region thereof in the tire radial direction toward both ends thereof. In the present embodiment, the reinforcing rubber layer 8 is formed such that the thickness varies in a stepped manner.

The laminated body 10, for example, is formed by two sheet-shaped rubber members 11 which are laminated together. The laminated body 10 is not limited to such an example, and may be formed by laminating three or more sheet-shaped rubber members 11 (shown in FIG. 5C).

The plurality of sheet-shaped rubber members 11 each has a constant thickness T. Such a reinforcing rubber layer 8 formed by sheet-shaped rubber members 11 has lesser parts where the thickness is locally reduced than a conventional crescent cross-sectional shaped structure with a thickness varying continuously. Thus, the reinforcing rubber layer 8 can maintain the rigidity high, improving durability of the tire. The thickness T of each sheet-shaped rubber member 11 is preferably equal to or more than 0.8 mm, more preferably equal to or more than 1.0 mm, but preferably equal to or less than 2.0 mm, more preferably equal to or less than 1.8 mm. In the present specification, the "constant thickness" includes a portion whose thickness changes at 0.2 mm/mm or less in the direction orthogonal to the thickness of the sheet-shaped rubber member 11. Further, both end portions 12 of each sheet-shaped rubber member 11 that have 2.0 mm length from the inner end 11$i$ and the outer end 11$e$ in the tire radial direction are excluded from a constant thickness region.

The reinforcing rubber layer 8 includes a maximum thickness portion 13 consisting of a part where a plurality of sheet-shaped rubber members 11 is laminated and a minimum thickness portion 14 where a plurality of sheet-shaped rubber members 11 is not laminated. The maximum thickness portion 13 according to the present embodiment is composed of two sheet-shaped rubber members 11 which are laminated. The minimum thickness portion 14, for example, is provided adjacent to both end sides of the maximum thickness portion 13 in the tire radial direction. In other words, the outer end portion 15 in the tire radial direction and the inner end portion 16 in the tire radial direction of the reinforcing rubber layer 8 according to the present embodiment are formed by the minimum thickness portion 14.

Preferably, the difference (Ta−Tb) between a thickness Ta of the maximum thickness portion 13 and a thickness Tb of the minimum thickness portion 14 is equal to or more than 1 mm. When the difference (Ta−Tb) is equal to or more than 1 mm, the rigidity of the maximum thickness portion 13 can increase and the durability can improve. When the difference (Ta−Tb) is excessively large, the rigidity of the maximum thickness portion 13 becomes excessively large, and the riding comfort performance may deteriorate, for example. From this point of view, the difference (Ta−Tb) is preferably equal to or less than 3.5 mm, more preferably equal to or less than 3.0 mm.

In order to effectively exert the above-mentioned effects, the ratio (Ta/Tb) of the thickness Ta to the thickness Tb is preferably equal to or more than 1.5, more preferably equal to or more than 1.8, but preferably equal to or less than 2.5, more preferably equal to or less than 2.3.

Preferably, the outer end portion 15 has a length L1 in the tire radial direction equal to or more than 3 mm. As a result, the difference in rigidity becomes smaller between the maximum thickness portion 13 and a radially outer region over the reinforcing rubber layer 8, and damage originating from the reinforcing rubber layer 8 can be suppressed. When the length L1 is excessively large, the manufacturing process of the tire may not be simplified. Thus, the length L1 is preferably equal to or less than 10 mm, more preferably equal to or less than 8 mm.

The inner end portion 16 overlaps with the bead apex rubber 9 in the tire radial direction. Thus, the inner end portion 16 is adjacent to a portion with high rigidity in the tire axial direction. As a result, in each bead portion 4, a portion having excessively high rigidity may be reduced. Although not particularly limited, a length L2 in the tire radial direction of the inner end portion 16 formed by the minimum thickness portion 14 is preferably smaller than the length L1. More preferably, the length L2 is equal to or less than 5 mm, still further preferably equal to or less than 3 mm.

In the normal state, it is preferable that an outermost end 19 in the tire radial direction of a contact position between the tire 1 and the normal rim R is located within a maximum thickness portion 13 region of the reinforcing rubber layer 8 in the tire radial direction. The outermost end 19 is a place where a large bending load is applied when the tire is running. Thus, by arranging the position of the outermost end 19 in the maximum thickness portion 13 region, deformation at the outermost end 19 can be suppressed.

A distance L4 in the tire radial direction between the outermost end 19 and the innermost end 13$i$ in the tire radial direction of the maximum thickness portion 13 is preferably equal to or more than 2% of a length L3 in the tire radial direction of the maximum thickness portion 13, more preferably equal to or more than 5%, but preferably equal to or less than 20% of the length L3, more preferably equal to or less than 10%. As a result, the above-mentioned effects can be effectively exerted.

In order to simplify the manufacturing process and increase the durability of the tire 1, the length L3 of the maximum thickness portion 13 is preferably equal to or more than 10% of a tire cross-sectional height H (shown in FIG. 1), more preferably equal to or more than 15%, but preferably equal to or less than 30% of the height H, more preferably equal to or less than 25%. As used herein, "tire cross-sectional height H" is the distance in the tire radial direction from the bead baseline BL to the outermost position of the tire in the tire radial direction. Further, the "bead baseline BL" is the tire axial line that passes through the rim diameter (see JATMA) position determined by the standard on which the tire 1 is based.

Preferably, a complex elastic modulus E*a of the reinforcing rubber layer 8 is equal to or more than two times a complex elastic modulus E*b of the clinch rubber 4G. As a result, the rigidity of each bead portion 4 can be increased and durability of the tire can be improved. In order to ensure a good balance between ride comfort and durability, the complex elastic modulus E*a of the reinforcing rubber layer 8 is more preferably equal to or more than 2.2 times the complex elastic modulus E*b of the clinch rubber 4G, but preferably equal to or less than 3.0 times the complex elastic modulus E*b, more preferably equal to or less than 2.8 times.

Although not particularly limited, the complex elastic modulus E*a of the reinforcing rubber layer 8 is preferably equal to or more than 10 MPa, more preferably equal to or more than 20 MPa, but preferably equal to or less than 70 MPa, more preferably equal to or less than 50 MPa. In the present specification, a complex elastic modulus E* is a value measured under the conditions shown below using a viscoelastic spectrometer such as "EPLEXOR (registered trademark)" in accordance with JIS K6394.
Initial distortion: 10%
Amplitude: plus/minus 2%
Frequency: 10 Hz
Deformation mode: Tension
Temperature: 70 deg. C As illustrated in FIG. 1, each bead apex rubber 9, for example, has a triangular cross-sectional shape. Although not particularly limited, the outermost end 9e in the tire radial direction of the bead apex rubber 9 is positioned such that bead apex rubber 9 overlaps with the maximum thickness portion 13 in the tire radial direction.

Preferably, a complex modulus E*c of the bead apex rubber 9, for example, is equal to a complex modulus E*a of the reinforcing rubber layer 8. Although not particularly limited, a complex elastic modulus E*c of the bead apex rubber 9 is preferably equal to or more than 80% of a complex elastic modulus E*a of the reinforcing rubber layer 8, more preferably equal to or more than 90%, but preferably equal to or less than 120% of a complex elastic modulus E*a of the reinforcing rubber layer 8, more preferably equal to or less than 110%. Preferably, the bead apex rubber 9 may have the same composition as the reinforcing rubber layer 8.

In this embodiment, the innermost end 3i in the tire radial direction of the sidewall rubber 3G overlaps with the maximum thickness portion 13 of the reinforcing rubber layer 8 in the tire radial direction. For example, the innermost end 3i of the sidewall rubber 3G is located outward in the tire radial direction of the outermost end 19 (shown in FIG. 2) of the contact position between the tire 1 and the normal rim R.

Preferably, a complex elastic modulus E*s of the sidewall rubber 3G is smaller than a complex elastic modulus E*b of the clinch rubber 4G. A complex elastic modulus E*s of the sidewall rubber 3G is preferably equal to or more than 3 MPa, more preferably equal to or more than 4 MPa, but preferably equal to or less than 8 MPa, more preferably equal to or less than 7 MPa.

The clinch rubber 4G is adjacent to an outer surface in the tire axial direction of the reinforcing rubber layer 8, for example. An outermost end 4e in the tire radial direction of the clinch rubber 4G is located outwardly in the tire radial direction with respect to the outermost end 13e in the tire radial direction of the maximum thickness portion 13 of the reinforcing rubber layer 8. In this embodiment, the innermost end 4i in the tire radial direction of the clinch rubber 4G is arranged inwardly in the tire radial direction with respect to the innermost end 13i of the maximum thickness portion 13.

Figure 3A:
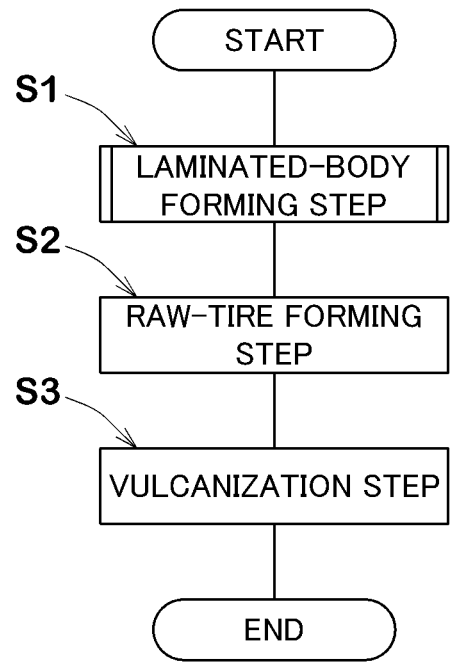
FIG. 3A is a flowchart showing an example of the processing procedure of a tire manufacturing method.

Next, a method for manufacturing such a tire 1 will be explained. FIG. 3A is a flowchart of the method for manufacturing the tire 1 according to the present embodiment. As illustrated in FIG. 3A, the method for manufacturing the tire 1 according to the present embodiment includes the steps of a laminated-body forming step Si for forming the laminated body 10, a raw-tire forming step S2 in which a raw tire (not illustrated) is formed using the laminated body 10, and a vulcanization step S3 for vulcanizing and molding the raw tire. Well-known methods can be appropriately adopted for the raw-tire forming step S2 and the vulcanization step S3.

Figure 3B:
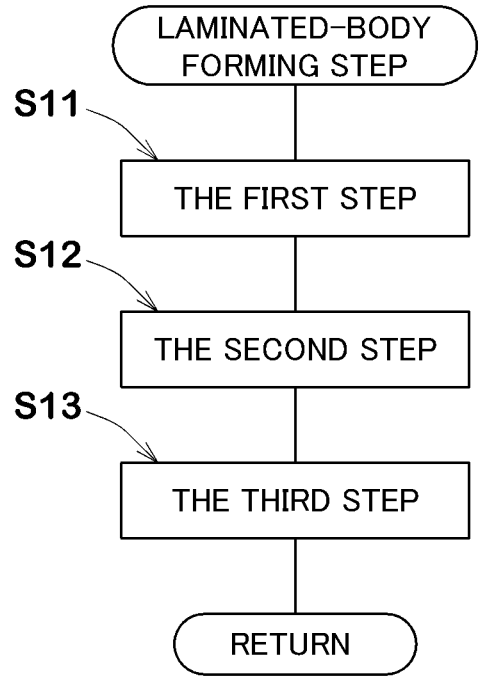
FIG. 3B is a flowchart showing an example of the processing procedure of a laminate body forming step.

FIG. 3B is a flowchart of the laminated-body forming step S1 according to the present embodiment. As illustrated in FIG. 3B, the laminated-body forming step S1 includes the first step S11, the second step S12, and the third step S13. The first step S11 is a step of preparing a base rubber sheet 20 (shown in FIG. 4A). The second step S12 is a step of cutting out a plurality of sheet-shaped rubber members 11 from the base rubber sheet 20 to prepare them. The third step S13 is a step of laminating a plurality of the sheet-shaped rubber members 11 cut out.

Figure 4A:
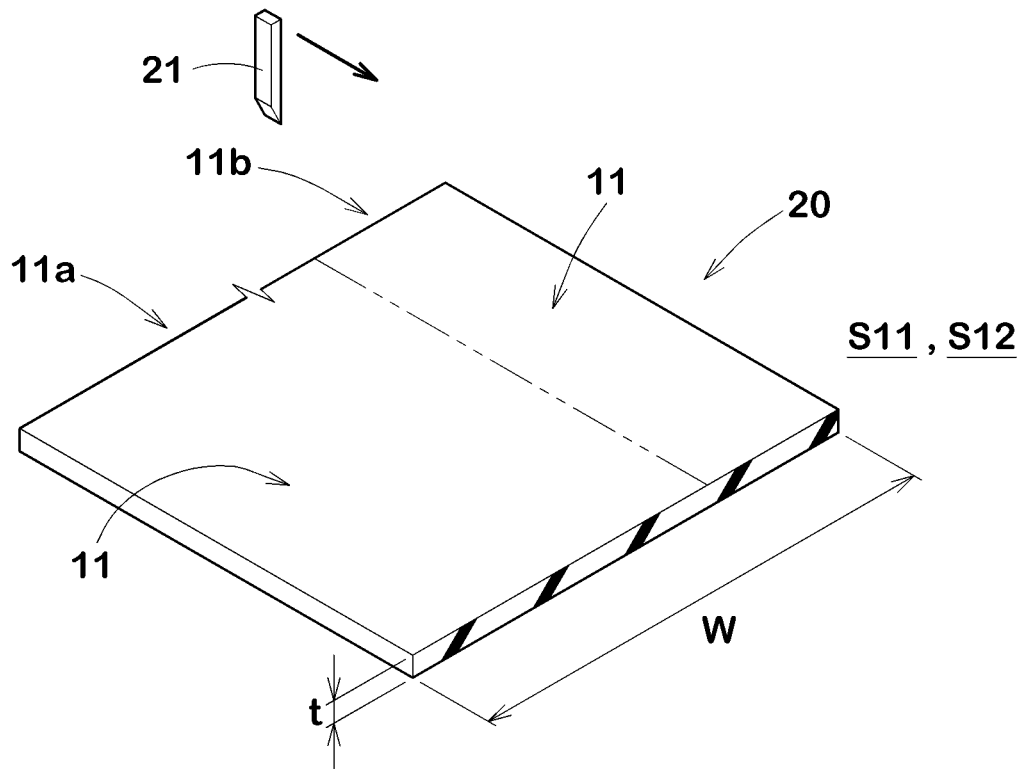
FIG. 4A is a perspective view of a base rubber sheet for explaining the first step and the second step.

FIG. 4A is a perspective view of the base rubber sheet 20 for schematically explaining the first step S11 and the second step S12. As illustrated in FIG. 4A, in the first step S11, for example, the base rubber sheet 20 is extruded from a well-known rubber extruder (not shown). The base rubber sheet 20 extruded from the rubber extruder has a constant thickness t. The thickness t of the base rubber sheet 20 (the sheet-shaped rubber members 11) is, for example, in a range from 1.0 to 3.0 mm.

Next, the second step S12 is conducted. In the second step S12 according to the present embodiment, for example, a plurality of sheet-shaped rubber members 11 is formed by cutting the base rubber sheet 20 by a well-known cutting tool 21 such as a cutter blade. In this embodiment, the base rubber sheet 20 is formed into two sheet-shaped rubber members 11a and 11b having different lengths in a width direction of the base rubber sheet 20 by cutting. In the laminated-body forming step Si according to the present embodiment, the base rubber sheet 20 can be cut and some sheet-shaped rubber members 11 each having a desired length according to the tire size can be taken out. Thus, tire manufacturing is simplified. Preferably, a width W of the base rubber sheet 20, for example, is the sum of the lengths (corresponding to the lengths in the tire radial direction) of a plurality of sheet-shaped rubber members 11 to be laminated. This allows the laminated body 10 to be formed from a single base rubber sheet 20, thus further simplifying tire manufacturing.

Figure 4B:
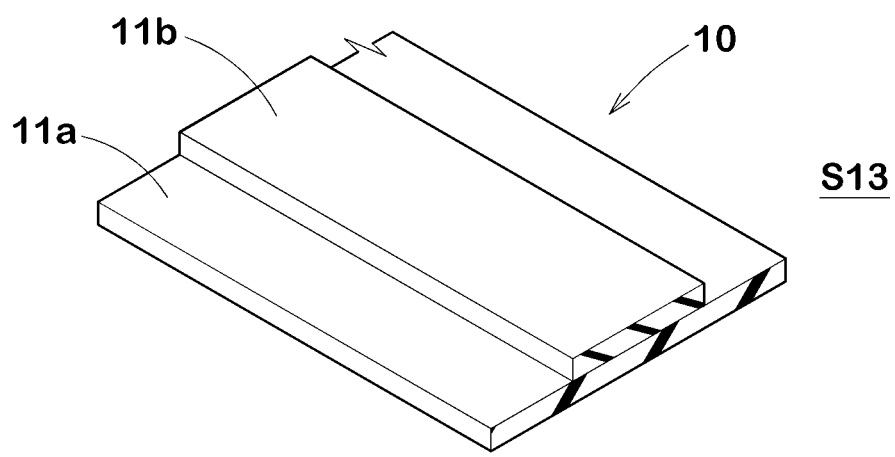
FIG. 4B is a perspective view of a laminated body for explaining the third step.

Next, the third step S13 is conducted. FIG. 4B is a perspective view of a laminated body 10 for schematically explaining the third step S13. As illustrated in FIG. 4B, in the third step S13 according to the present embodiment, a plurality of sheet-shaped rubber members 11 a and 11b having the same thickness and different lengths in the tire radial direction are laminated to each other. A well-known technique is adopted as the laminating method of the sheet-shaped rubber members 11. Note that before vulcanization the ends of the sheet-shaped rubber members 11 are less likely to be deformed.

Figure 5A:
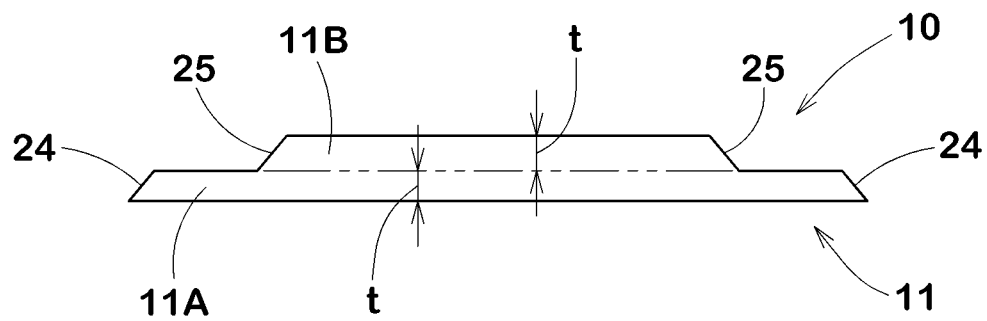
FIG. 5A is an end view of a laminated body according to an embodiment.

FIG. 5A is an end view of the laminated body 10 manufactured in the third step S13 of the present embodiment. As illustrated in FIG. 5A, the laminated body 10 according to this embodiment is formed by two sheet-shaped rubber members 11. The sheet-shaped rubber members 11 consists of a first sheet-shaped rubber member 11A which is larger in length, and a second sheet-shaped rubber member 11B which is smaller in length than the first sheet-shaped rubber member 11A. The laminated body 10 according to the present embodiment is formed such that both ends 25 of the second sheet-shaped rubber member 11B are located inwardly with respect to both ends 24 of the first sheet-shaped rubber member 11A. Then, in the raw-tire forming step S2, the raw tire is formed such that the first sheet-shaped rubber member 11A is located inwardly in the tire axial direction with respect to the second sheet-shaped rubber member 11B.

Figure 5B:
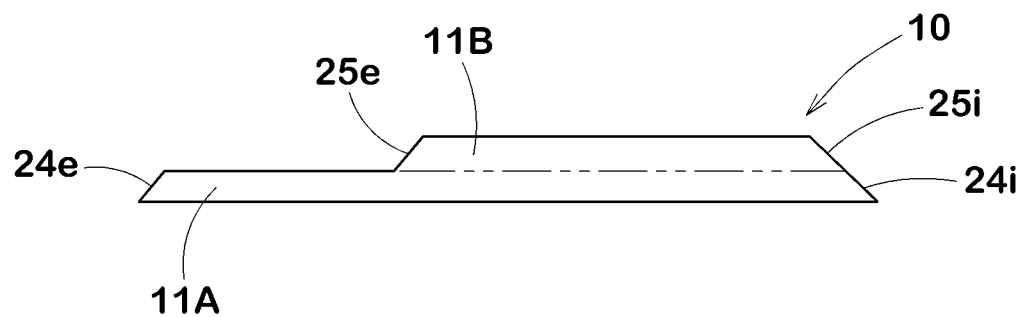
FIG. 5B is an end view of the laminated body according to another embodiment.

FIG. 5B is an end view of the laminated body 10 according to another embodiment manufactured in the third step S13. As shown in FIG. 5B, the laminated body 10 according to this embodiment is formed such that one end 25i of the second sheet-shaped rubber member 11B is located on one end 24i of the first sheet-shaped rubber member 11A. Further, the other end 25e of the second sheet-shaped rubber member 11B is formed so as to be located inwardly with respect to the other end 24e of the first sheet-shaped rubber member 11A. Then, in the raw-tire forming step S2, the raw tire is formed such that one end 24i of the first sheet-shaped rubber member 11A is located inwardly in the tire radial direction with respect to the other end 24e of the first sheet-shaped rubber member 11A.

Figure 5C:
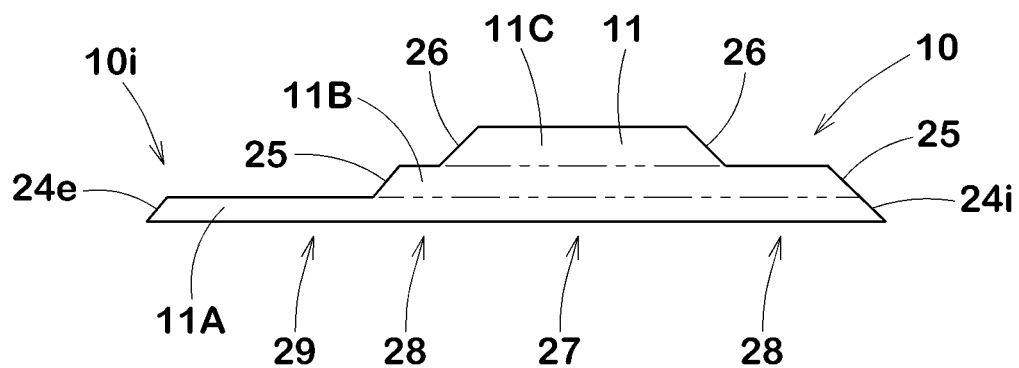
FIG. 5C is an end view of the laminated body according to yet another embodiment.

FIG. 5C is an end view of the laminated body 10 according to yet another embodiment manufactured in the third step S13. As shown in FIG. 5C, the laminated body 10 according to this embodiment further includes a third sheet-shaped rubber member 11C, which is smaller in length than the second sheet-shaped rubber member 11B. The laminated body 10, for example, is formed such that both ends 26 of the third sheet-shaped rubber member 11C are located inwardly with respect to both ends 25 of the second sheet-shaped rubber member 11B. As a result, the laminated body 10 according to this embodiment has a portion 27 in which three sheet-shaped rubber members 11 are laminated and portions 28 in which two sheet-shaped rubber members 11 are laminated. In the laminated body 10 according to this embodiment, the portions 28 in which two sheet-shaped rubber members 11 are laminated are adjacent to both sides of the portion 27 in which three sheets-shaped rubber members 11 are laminated, for example. Also, a non-laminated portion 29 where the sheet-shaped rubber members 11 are not laminated is formed at one end 10i of the laminated body 10. Then, in the raw-tire forming step S2, the raw tire may be formed such that one end 24i of the first sheet-shaped rubber member 11A is located inwardly in the tire radial direction with respect to the other end 24e of the first sheet-shaped rubber member 11A.

While the particularly preferable embodiments in accordance with the present disclosure have been described in detail, the present disclosure is not limited to the illustrated embodiments, but can be modified and carried out in various aspects within the scope of the disclosure.

EXAMPLE

Pneumatic tires having the basic structure of FIG. 1 were prepared based on the specifications in Table 1. Then, the durability of each test tire was tested. The common specifications and test methods for each test tire are as follows.
Durability Test:
After each test tire was set to a drum tester, the tire was run under the following conditions, and the mileage until either bead portion was damaged was measured. The results are shown in Table 1 using an index with comparative Example 1 as 100. The larger the value, the better the durability. Tires with an index of 95 or higher are passed.

Tire size: 225/85R16

Rim size: 6.0J

Tire load: 18.95 kN

Speed: 80 km/h $E^*b$: 10.0 MPa

The test results are shown in Table 1.

The reinforcing rubber layers in the comparative examples are not a laminated body, but the shape as it is extruded integrally from a rubber extruder. Further, the reinforcing rubber layers of both the comparative examples and the examples each are the same as with each other with respect to a length in the tire radial direction, and a thickness of the maximum thickness portion and the length in the tire radial direction. The "profile" of comparative Example 1 has a crescent shape in which the reinforcing rubber layer continuously increases in thickness from the inner end and the outer end in the tire radial direction toward the center thereof.

TABLE 1

|  | Comparative example 1 | Comparative example 2 | Ex. 1 | Ex. 2 | Ex. 3 | Ex. 4 |
| --- | --- | --- | --- | --- | --- | --- |
| Shape of reinforcing rubber layer | Profile | Trapezoid | FIG. 5A | FIG. 5A | FIG. 5C | FIG. 5A |
| T1 (mm) | 3 | 3 | 3 | 3 | 3 | 3 |
| T2 (mm) | — | 3 | 1.5 | 1.5 | 1 | 1.5 |
| T (mm) | — | — | 1.5 | 1.5 | 1 | 1.5 |
| L1 (mm) | 0 | 0 | 3 | 3 | 3 | 0 |
| $E^*a/E^*b$ | 2 | 2 | 2 | 0.5 | 2 | 2 |
| Durability test [index: larger is better] | 100 | 80 | 150 | 95 | 150 | 120 |

As a result of the test, it is confirmed that the tires of the examples have improved durability as compared with the tires of the comparative examples. Further, the tires of the examples are simpler to manufacture than the tires of the comparative examples. In particular, the test tires of Example 1 to Example 3 have a high degree of simplification.

[Additional Notes]

The present disclosure includes the following additional notes.

[Note 1]

A pneumatic tire comprising:

a pair of bead portions;

a pair of bead cores each disposed in a respective one of the pair of bead portions;

a carcass extending between the pair of bead cores, the carcass comprising a carcass ply that comprises a main portion extending between the pair of bead cores and a pair of turn-up portions each turned up around a respective one of the pair of bead cores from axially inside to outside of the tire and extending outwardly in a tire radial direction; and a reinforcing rubber layer disposed in each bead portion and being adjacent to an axially outside of the turn-up portion, wherein the reinforcing rubber layer has a laminated body in which a plurality of sheet-shaped rubber members having different radial lengths are laminated in the tire axial direction.

[Note 2]

The pneumatic tire according to note 1, wherein
a thickness of the reinforcing rubber layer decreases from a center region thereof in the tire radial direction toward both ends thereof

[Note 3]

The pneumatic tire according to note 1 or 2, wherein
the reinforcing rubber layer comprises a maximum thickness portion consisting of a part where the plurality of sheet-shaped rubber members is laminated and a minimum thickness portion where the plurality of sheet-shaped rubber members is not laminated, and
a difference (Ta−Tb) between a thickness Ta of the maximum thickness portion and a thickness Tb of the minimum thickness portion is equal to or more than 1 mm.

[Note 4]

The pneumatic tire according to note 3, wherein
a ratio (Ta/Tb) of the thickness Ta to the thickness Tb is in a range from 1.5 to 2.5.

[Note 5]

The pneumatic tire according to note 3 or 4, wherein
the minimum thickness portion forms an outer end portion in the tire radial direction of the reinforcing rubber layer.

[Note 6]

The pneumatic tire according to note 5, wherein
the outer end portion has a length in the tire radial direction equal to or more than 3 mm.

[Note 7]

The pneumatic tire according to any one of notes 3 to 6, wherein
the minimum thickness portion forms an inner end portion in the tire radial direction of the reinforcing rubber layer.

[Note 8]

The pneumatic tire according to any one of notes 3 to 6, wherein
the maximum thickness portion forms an inner end portion in the tire radial direction of the reinforcing rubber layer.

[Note 9]

The pneumatic tire according to any one of notes 3 to 8, wherein
in a normal state in which the tire is mounted to a normal rim and inflated to a normal inner pressure but loaded with no load, an outermost end in the tire radial direction of a contact position between the tire and the normal rim is located within a maximum thickness portion region of the reinforcing rubber layer in the tire radial direction.

[Note 10]

The pneumatic tire according to any one of notes 1 to 9, wherein
the laminated body comprises a portion in which three or more of the sheet-shaped rubber members are laminated and a portion where two sheet-shaped rubber members are laminated.

[Note 11]

The pneumatic tire according to any one of notes 1 to 10, wherein
in each bead portion, a clinch rubber is disposed outwardly in the tire radial direction of the reinforcing rubber layer, and
a complex elastic modulus of the reinforcing rubber layer is equal to or more than two times a complex elastic modulus of the clinch rubber.

[Note 12]

A method for manufacturing the pneumatic tire according to note 1, the method comprising the step of forming the laminate body by laminating the plurality of sheet-shaped rubber members having a same thickness and different radial lengths.

[Note 13]

The method according to note 12, wherein
each of the plurality of sheet-shaped rubber members has a constant thickness.

[Note 14]

The method according to note 12 or 13, further comprising the step of cutting out a plurality of sheet-shaped rubber members from a base rubber sheet having a constant thickness to prepare the plurality of sheet-shaped rubber members.

[Note 15]

The method according to any one of notes 12 to 14, wherein
the thickness of the plurality of sheet-shaped rubber members is in a range from 1.0 to 3.0 mm.

The invention claimed is:

1. A pneumatic tire comprising:
a pair of bead portions;
a pair of bead cores each disposed in a respective one of the pair of bead portions;
a carcass extending between the pair of bead cores, the carcass comprising a carcass ply that comprises a main portion extending between the pair of bead cores and a pair of turn-up portions each turned up around a respective one of the pair of bead cores from axially inside to outside of the tire and extending outwardly in a tire radial direction; and
a reinforcing rubber layer disposed in each bead portion and being adjacent to an axially outside of a respective one of the pair of turn-up portions, wherein
the reinforcing rubber layer has a laminated body in which a plurality of sheet-shaped rubber members having different radial lengths are laminated in the tire axial direction,
the plurality of sheet-shaped rubber members are rubber sheet members in which cords are not embedded,
the reinforcing rubber layer comprises a maximum thickness portion having a part where the plurality of sheet-shaped rubber members is laminated and a minimum thickness portion where the plurality of sheet-shaped rubber members is not laminated,
a difference (Ta−Tb) between a thickness Ta of the maximum thickness portion and a thickness Tb of the minimum thickness portion is equal to or more than 1 mm,
the minimum thickness portion forms an outer end portion in the tire radial direction of the reinforcing rubber layer,
the outer end portion has a length in the tire radial direction equal to or more than 3 mm,
in a normal state in which the tire is mounted to a normal rim and inflated to a normal inner pressure but loaded with no load, an outermost end in the tire radial direction of a contact position between the tire and the normal rim is located within the maximum thickness portion region of the reinforcing rubber layer in the tire radial direction,
each sheet-shaped rubber member has a maximum thickness equal to or less than 2.0 mm,
in each bead portion, a clinch rubber is disposed outwardly in the tire radial direction of the reinforcing rubber layer, and a complex elastic modulus of the reinforcing rubber layer is equal to or more than two times a complex elastic modulus of the clinch rubber.

2. The pneumatic tire according to claim 1, wherein a thickness of the reinforcing rubber layer decreases from a center region thereof in the tire radial direction toward both ends thereof.

3. The pneumatic tire according to claim 1, wherein a ratio (Ta/Tb) of the thickness Ta to the thickness Tb is in a range from 1.5 to 2.5.

4. The pneumatic tire according to claim 1, wherein the minimum thickness portion forms an inner end portion in the tire radial direction of the reinforcing rubber layer.

5. The pneumatic tire according to claim 1, wherein the maximum thickness portion forms an inner end portion in the tire radial direction of the reinforcing rubber layer.

6. The pneumatic tire according to claim 1, wherein the laminated body comprises a portion in which three or more of the sheet-shaped rubber members are laminated and a portion where two sheet-shaped rubber members are laminated.

7. The pneumatic tire according to claim 1, wherein the maximum thickness portion comprises a portion extending in the tire radial direction with the thickness Ta that is constant.

8. The pneumatic tire according to claim 7, wherein the minimum thickness portion comprises a portion extending in the tire radial direction with the thickness Tb that is constant.

9. The pneumatic tire according to claim 8, wherein the minimum thickness portion forms an outer end portion and an inner portion in the tire radial direction of the reinforcing rubber layer.

10. The pneumatic tire according to claim 9, wherein a length L2 in the tire radial direction of the inner end portion formed by the minimum thickness portion is smaller than a length L1 in the tire radial direction of the outer end portion formed by the minimum thickness portion.

11. The pneumatic tire according to claim 10, wherein the length L2 is equal to or less than 5 mm, and the length L1 is equal to or less than 10 mm.

12. The pneumatic tire according to claim 1, wherein the plurality of sheet-shaped rubber members is made of the same rubber material.

13. The pneumatic tire according to claim 1, wherein the plurality of sheet-shaped rubber members comprises an axial inner rubber member and an axial outer rubber member arranged outwardly in the tire axial direction of the axial inner rubber member,
the axial inner rubber member has an outer end in the tire radial direction located outwardly of an outer end in the tire radial direction of the axial outer rubber member, and
the axial inner rubber member has an inner end in the tire radial direction located inwardly of an inner end in the tire radial direction of the axial outer rubber member.

14. A pneumatic tire comprising:
a pair of bead portions;
a pair of bead cores each disposed in a respective one of the pair of bead portions;
a carcass extending between the pair of bead cores, the carcass comprising a carcass ply that comprises a main portion extending between the pair of bead cores and a pair of turn-up portions each turned up around a respective one of the pair of bead cores from axially inside to outside of the tire and extending outwardly in a tire radial direction to a radially outer end thereof; and a reinforcing rubber layer disposed in each bead portion and being adjacent to an axially outside of a respective one of the pair of turn-up portions, wherein
the reinforcing rubber layer has a laminated body in which a plurality of sheet-shaped rubber members having different radial lengths are laminated in the tire axial direction,
the reinforcing rubber layer comprises a maximum thickness portion having a part where the plurality of sheet-shaped rubber members is laminated and a minimum thickness portion where the plurality of sheet-shaped rubber members is not laminated,
a difference (Ta−Tb) between a thickness Ta of the maximum thickness portion and a thickness Tb of the minimum thickness portion is equal to or more than 1 mm,
the minimum thickness portion forms an outer end portion in the tire radial direction of the reinforcing rubber layer,
the outer end portion has a length in the tire radial direction equal to or more than 3 mm,
a radially outermost end of the reinforcing rubber layer is located radially inwardly of a radially outermost end of the turn-up portions,
the plurality of sheet-shaped rubber members are rubber sheet members in which cords are not embedded, and
each sheet-shaped rubber member has a maximum thickness equal to or less than 2.0 mm.

15. The pneumatic tire according to claim 14, wherein
the plurality of sheet-shaped rubber members comprises an axial inner rubber member and an axial outer rubber member arranged outwardly in the tire axial direction of the axial inner rubber member,
the axial inner rubber member has an outer end in the tire radial direction located outwardly of an outer end in the tire radial direction of the axial outer rubber member, and the axial inner rubber member has an inner end in the tire radial direction located inwardly of an inner end in the tire radial direction of the axial outer rubber member.

16. A pneumatic tire comprising:
a pair of bead portions;
a pair of bead cores each disposed in a respective one of the pair of bead portions;
a carcass extending between the pair of bead cores, the carcass comprising a carcass ply that comprises a main portion extending between the pair of bead cores and a pair of turn-up portions each turned up around a respective one of the pair of bead cores from axially inside to outside of the tire and extending outwardly in a tire radial direction;
a bead apex rubber extending outwardly in the tire radial direction from the bead core to a radially outermost end thereof in each bead portion; and
a reinforcing rubber layer disposed in each bead portion and being adjacent to an axially outside of a respective one of the pair of turn-up portions, wherein
the reinforcing rubber layer has a laminated body in which a plurality of sheet-shaped rubber members having different radial lengths are laminated in the tire axial direction,
the reinforcing rubber layer comprises a maximum thickness portion having a part where the plurality of sheet-shaped rubber members is laminated and a minimum thickness portion where the plurality of sheet-shaped rubber members is not laminated, a difference (Ta−Tb) between a thickness Ta of the maximum thickness portion and a thickness Tb of the minimum thickness portion is equal to or more than 1 mm, the minimum thickness portion forms an outer end portion in the tire radial direction of the reinforcing rubber layer, the outer end portion has a length in the tire radial direction equal to or more than 3 mm, the radially outermost end in the tire radial direction of the bead apex rubber is positioned within a region of the maximum thickness portion in the tire radial direction, the plurality of sheet-shaped rubber members are rubber sheet members in which cords are not embedded, and each sheet-shaped rubber member has a maximum thickness equal to or less than 2.0 mm.

17. The pneumatic tire of claim 16, wherein in each bead portion, the turn-up portion comprises a contact part in which the turn-up portion is in direct contact with a main portion of the carcass ply, and the contact portion overlaps the maximum thickness portion at least partially in the tire radial direction.

18. The pneumatic tire of claim 16, wherein a length in the tire radial direction of the maximum thickness portion is greater than a length in the tire radial direction of the bead apex rubber.

19. The pneumatic tire according to claim 16, wherein the plurality of sheet-shaped rubber members comprises an axial inner rubber member and an axial outer rubber member arranged outwardly in the tire axial direction of the axial inner rubber member, the axial inner rubber member has an outer end in the tire radial direction located outwardly of an outer end in the tire radial direction of the axial outer rubber member, and the axial inner rubber member has an inner end in the tire radial direction located inwardly of an inner end in the tire radial direction of the axial outer rubber member.

* * * * *